United States Patent [19]

Kaminishi

[11] Patent Number: 5,444,561
[45] Date of Patent: Aug. 22, 1995

[54] OPTICAL TRANSMISSION APPARATUS

[75] Inventor: Katsuji Kaminishi, Yokohama, Japan

[73] Assignee: Kabushiki Kaisha Toshiba, Kawasaki, Japan

[21] Appl. No.: 14,686

[22] Filed: Feb. 8, 1993

[30] Foreign Application Priority Data

Feb. 26, 1992 [JP] Japan .................................. 4-039007

[51] Int. Cl.⁶ .......................................... H04B 10/00
[52] U.S. Cl. ..................................... 359/158; 359/181; 359/189; 359/195; 372/26
[58] Field of Search ............... 359/154, 158, 180, 181, 359/188, 189, 195; 372/29, 31, 26

[56] References Cited

U.S. PATENT DOCUMENTS

| 3,774,178 | 11/1973 | Curtis | 340/174.1 G |
|---|---|---|---|
| 4,611,352 | 9/1986 | Fujito et al. | 359/154 |
| 4,679,252 | 7/1987 | Holland | 359/189 |
| 4,736,120 | 4/1988 | Foster | 307/269 |
| 4,833,680 | 5/1989 | Kaiser et al. | 372/29 |
| 4,876,442 | 10/1989 | Fakushima | 250/205 |
| 4,980,891 | 12/1990 | Izadpanah | 372/25 |
| 5,121,416 | 6/1992 | Takano | 375/110 |

FOREIGN PATENT DOCUMENTS

| 3315205 | 12/1983 | Germany . | |
|---|---|---|---|
| 3434217 | 4/1985 | Germany . | |
| 3436722 | 4/1986 | Germany . | |
| 3508034 | 9/1986 | Germany . | |
| 3171941 | 7/1991 | Japan | H04B 10/18 |
| 0491272 | 6/1992 | Japan | 359/180 |

OTHER PUBLICATIONS

D. Lutzke, Lichtwellenleitertechnik, 1986, pop. 308-327.
K. Kroschel, Datenubertragung, 1991, pp. 213-215.
Electronics Letters, vol. 25, No. 21, Oct. 12, 1989, pp. 1465-1466, "7.7 Gbit/s Benchtop Regenerator."
Electronics Letters, vol. 38, No. 8, Aug. 1990, pp. 1122-1124, "A Narrow Bandpass Microstrip Filter for High-Speed Fiber Optic Systems."
Silva, Sensitivity degradation with Laser wavelength chirp for direct-detection optical receivers, IEE Proceedings vol., 136 Aug. 1989.

Primary Examiner—Leo H. Boudreau
Assistant Examiner—Rafael Bacares
Attorney, Agent, or Firm—Oblon, Spivak, McClelland, Maier & Neustadt

[57] ABSTRACT

An optical transmission apparatus of NRZ modulation system includes a laser driving circuit for deriving a current obtained by adding together an NRZ modulation signal, a D.C. bias, and a clock signal having an amplitude smaller than the bias, a semiconductor laser driven by the laser driving circuit, an optical fiber for transmitting a laser beam from the semiconductor laser to a reception side, a photodetector for detecting a laser beam on the reception side and converting the detected laser beam to an electrical signal, a data regenerating circuit for deriving an NRZ modulation signal from the detected electrical signal, and a clock extracting circuit for extracting the clock signal superposed on the NRZ modulation signal from the detected electrical signal.

25 Claims, 3 Drawing Sheets

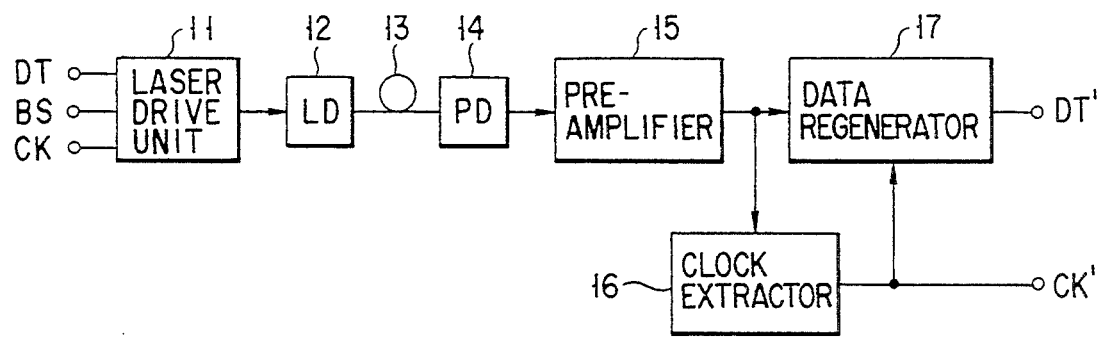
F I G. 1
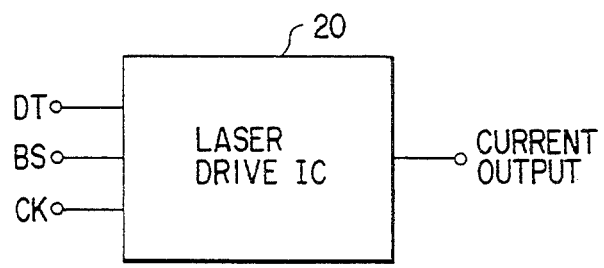
F I G. 2A
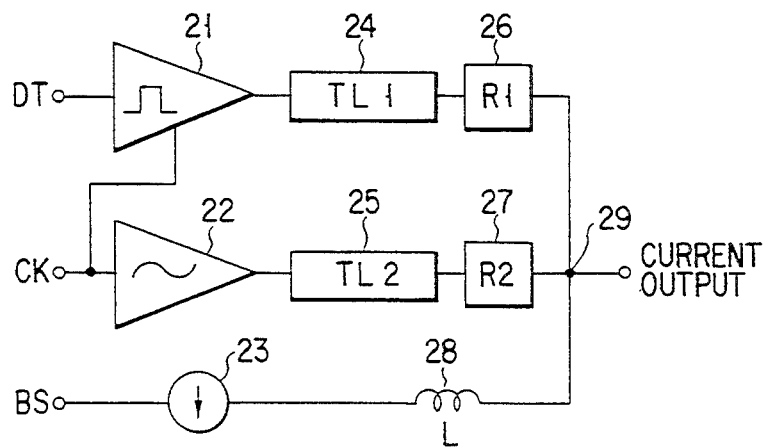
F I G. 2B

OPTICAL TRANSMISSION APPARATUS

BACKGROUND OF THE INVENTION

1. Field of the Invention

This invention relates to an optical transmission apparatus used for NRZ modulation type very high speed optical communication or the like, and more particularly to an optical transmission apparatus having improved clock transmitting/extracting means.

2. Description of the Related Art

In recent years, the optical communication technique has been positively put to practice and enhanced. From the viewpoint of efficient utilization of the same physical resources, an increase in the clock frequency has been strongly required. In order to meet the above requirement, the operation frequencies of various devices constructing the system have been set to values near the respective maximum permissible frequencies. Therefore, the performance of a clock extracting circuit which requires the widest bandwidth in the system is dealt with as one of the most important technical key points.

In the amplitude modulation optical communication in the ultra high frequency band higher than several Gb/s, the NRZ modulation system in which the effective bandwidth can be made narrow is used. An NRZ modulation signal transmitted in the above system is created as follows. That is, it is determined according to a data signal input in synchronism with the clock frequency whether the level of an NRZ modulation signal to be created is kept at the level ("HIGH" or "LOW") of the NRZ modulation signal set in a cycle presented one clock before the present cycle or changed to an inverted level (from "HIGH" to "LOW" or from "LOW" to "HIGH"). Then, this operation is sequentially repeated.

Thus, a transmission signal does not explicitly contain a clock frequency component. Therefore, in the optical communication of a conventional NRZ modulation system, it is necessary to extract a clock component implicitly contained in the reception signal on the reception side and restore the clock based on the extracted clock component. A circuit having the above function is disclosed in an article by MIZUHARA, O., et al, "7.7 Gbit/s BENCHTOP REGENERATOR", ELECTRONICS LETTERS, 1989, Vol. 25, No. 21, pp 1465-1466, for example. In the above circuit, a reception signal whose D.C. component is cut off by a wide band A.C. amplifier on the reception side is rectified by a full-wave rectifier circuit to regenerate a clock frequency component. Then, the clock frequency component is amplified by an amplifier and supplied to a bandpass filter having a large Q so as to suppress the other frequency component except the clock frequency. Further, the clock signal is output via a waveform shaping circuit constructed by a limiter amplifier and a phase shifter so as to extract a clock signal synchronized with the reception signal.

However, this type of method has the following problem. That is, in spite of the fact that the bandwidth of a signal transmitted by use of the NRZ modulation System is suppressed to half of the clock frequency, it is necessary to use an active device having a wider bandwidth than that of the clock frequency on the reception side although only in the partial portion.

Further, with the above method, even when the probabilities of "high" and "low" in the pattern of a signal transmitted are set as close as possible to each other by introducing a signal such as scrambler, the degree of equalization is limited. Therefore, the phase of a clock signal extracted according to a variation in the above pattern would vary. As a result, clock jitter may occur and the clock synchronizing operation of the system will become unstable. Further, since a signal processing operation such as insertion or elimination of the scrambler signal which may lower the transmission efficiency is indispensable, a complicated system configuration is required.

Further, another problem occurs in the application thereof. That is, in recent years, the optical communication is not only used for pure tele-communication but is also used as an optical link for connecting the buses of computers to each other by combining parallel/serial signal converters. In the case of such an application, the data signal itself contains an extremely low frequency component. Therefore, it becomes important to use a means capable of easily and continuously transmitting a clock without processing the data signal.

Thus, in the prior art, in the optical transmission system using the NRZ modulation system, complicated process and circuit construction are required and parts which are operated at a frequency higher than the clock frequency are indispensable. Further, an influence by the transmission signal pattern cannot be eliminated and it is difficult to ensure that the clock can be always stably extracted.

SUMMARY OF THE INVENTION

This invention has been made in view of the above problems and an object of this invention is to provide an optical transmission apparatus which has a simple system construction made at a low cost and which can continuously extract a clock without receiving any influence by the transmission signal pattern.

The important factor of this invention is to superpose a clock signal on an NRZ modulation signal on the transmission side and extract the clock signal superposed on the NRZ modulation signal on the reception side.

That is, in order to attain the above object, an optical transmission apparatus of NRZ modulation system according to this invention comprises:

output means for outputting from a transmission side a laser beam derived by superposing a D.C. bias and a clock signal having an amplitude smaller than that of the D.C. bias on an NRZ modulation signal;

an optical fiber for transmitting the laser beam output from the outputting means to a reception side;

a photodetector for detecting the laser light on the reception side and converting the detected laser beam to an electrical signal;

a data regenerating circuit for deriving an NRZ modulation signal from the detected electrical signal; and a clock extracting circuit for extracting the clock signal superposed on the NRZ modulation signal from the detected electrical signal.

Preferably, the means for outputting the laser beam may be constructed to include a semiconductor laser driven by a current to generate a laser beam; and a laser driving circuit for driving the semiconductor laser by a current obtained by adding together a D.C. bias current, an NRZ modulation signal current generated in synchronism with the clock and a clock sinusoidal current having an amplitude smaller than the bias current.

Further, preferably, the means for outputting the laser beam may be constructed to supply a laser beam from the semiconductor laser driven by a D.C. current to an external modulator and modulate the beam by using the NRZ modulation signal, D.C. bias and clock signal as a combined voltage signal.

A second optical transmission apparatus of NRZ modulation system according to this invention comprises:

a semiconductor laser for outputting a preset laser beam;

a current source for driving the semiconductor laser; and superposing means for superposing a D.C. bias and a clock signal having an amplitude smaller than that of the bias on an NRZ modulation signal to derive an input current to the semiconductor laser or a laser light output from the semiconductor laser.

Further, a third optical transmission apparatus of NRZ modulation system according to this invention comprises:

a photodetector for detecting a laser beam derived by superposing a D.C. bias and a clock signal having an amplitude smaller than that of the bias on an NRZ modulation signal and converting the detected laser beam to an electrical signal;

a data regenerating circuit for deriving the NRZ modulation signal from the electrical signal detected by means of the photodetector; and a clock extracting circuit for extracting the clock signal superposed on the NRZ modulation signal from the detected electrical signal.

In the optical communication of a system for effecting the NRZ direct modulation by use of ultra high frequencies higher than several Gb/s, the semiconductor laser cannot provide a sufficient high frequency characteristic if a D.C. current bias larger than a threshold value is not kept supplied thereto. That is, the semiconductor laser must be used in a state in which a laser output is always obtained even when the transmission data signal is set at a low level. Then, the high or low state of the signal is determined according to whether the light intensity of the laser output of the semiconductor laser is high or low. Therefore, in the very high speed optical communication system, a laser beam of D.C. level is always transmitted. In this condition, it is possible to superpose a sinusoidal signal of an amplitude smaller than the D.C. level on the laser beam and directly transmit the superposed signal.

This invention has been made with much attention paid to the above point. That is, a clock signal in addition to the NRZ modulation signal which does not directly contain a clock frequency component is superposed on the laser output as the sinusoidal signal thereof. As a result, a clock signal can be continuously transmitted irrespective of the presence or absence of a transmission data signal or the pattern thereof.

As described above, when the data signal and the clock signal are combined together and the combined signal is transmitted as an intensity amplitude modulation signal for the laser beam, it is possible in principle to separate the two signals from each other. In this case, an influence of the NRZ modulation signal on the clock signal in the above means is checked by taking the state of the actual spectrum distribution into consideration. Then, the following result is obtained. That is, when harmonic components of relatively low order among the spectra contained in the NRZ modulation signal lie in a frequency region relatively closer to the clock frequency, the spectral power of the harmonic component is large but the interval between the spectra is rough. Further, the harmonic component does not lie in a frequency region extremely near the clock frequency. Therefore, the NRZ modulation signal and the clock signal can be separated from each other by use of a filter whose Q is not so high. On the other hand, when the basic frequency of the NRZ modulation signal is low and the high-order harmonics lie in a frequency region extremely close to the clock frequency, the spectral power of the harmonics is reduced in inverse proportion to the square of the order of the harmonic. Therefore, even if they cannot be completely separated from each other by the filter, the influence of the NRZ modulation signal on the clock signal can be neglected.

Further, it is necessary to set the magnitude of the clock signal to be superposed to a value which is small enough to prevent a significant influence from being given to the NRZ modulation signal, but it is not necessary to set the same to an extremely small value. This is because the NRZ modulation signal is completely coherent with respect to the clock, and only a preset wave distortion is given to the signal.

Owing to the relative phase relation between the NRZ modulation signal and the clock, the rise time may sometimes be made short and the fall time may be made long. In a different case, an inverted influence may be given to the rise time and fall time. Further, a signal distortion such as overshoot, undershoot, ringing or the like may sometimes occur. However, once the phase relation is determined, the signal distortion is given as a distortion which is always constant. Therefore, if the distortion lies within a discriminating range in which it can be discriminated by use of a discriminator, it does not develop into a serious problem at the time of demodulation of the signal. Of course, it is possible to provide a sharp notch filter in the input section of a signal processing circuit to eliminate only the clock frequency component and completely eliminate the influences.

As described above, according to this invention, a clock can be continuously extracted without receiving any influence by the transmission signal pattern by superposing the clock signal on the NRZ modulation signal on the transmission side and extracting the clock signal superposed on the NRZ modulation signal on the reception side. Further, an optical transmission apparatus which has a simple system construction made at a low cost can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the system construction of an optical transmission apparatus according to a first embodiment of this invention;

FIG. 2A is a block diagram showing an example of a laser driving circuit used in the first embodiment;

FIG. 2B is a block diagram showing another example of the laser driving circuit used in the first embodiment;

DETAILED DESCRIPTION OF THE PREFERRED EMBODIMENTS

Figure 3A:
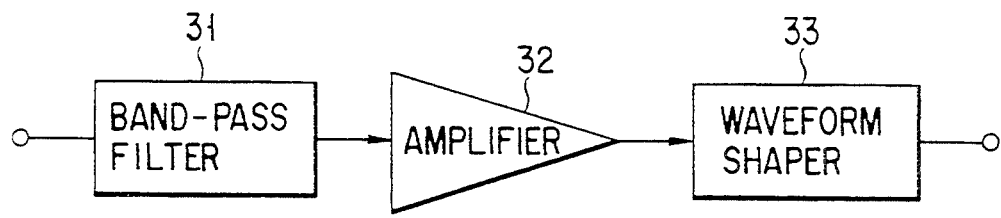
FIG. 3A is a block diagram showing an example of a clock extracting circuit used in the first embodiment.

There will now be described an embodiment of this invention with reference to the accompanying drawings.

FIG. 1 is a schematic construction diagram showing an optical transmission apparatus according to a first embodiment of this invention. The transmitter section of the optical transmission apparatus includes a laser driving circuit 11 and a semiconductor laser 12. The receiver section thereof includes a light detector 14, pre-amplifier 15, clock extracting circuit 16 and data regenerating circuit 17. Further, the transmitter section and the receiver section are connected to each other via an optical fiber 13.

The laser driving circuit 11 is supplied with an NRZ modulation signal DT, bias signal BS and clock signal CK and outputs a current which is created by superposing the bias signal BS and clock signal CK on the NRZ modulation signal DT. The semiconductor laser 12 is driven by the current from the laser driving circuit. Therefore, the semiconductor laser 12 outputs an optical output modulated by the current.

In the photodetector 14, a laser beam emitted from the semiconductor laser 11 and input via the optical fiber 13 is demodulated and converted into an electrical signal. The electrical signal is amplified by the preamplifier 15 and then is supplied to the clock extracting circuit 16 and data regenerating circuit 17. In the clock extracting circuit 16, a clock signal CK' is extracted as described later. In the data regenerating circuit 17, a data signal DT' contained in the electrical signal is regenerated according to the extracted clock signal CK'. A notch filter for eliminating only the clock signal may be inserted in the preceding stage of the demodulated signal input of the data regenerating circuit 17.

FIGS. 2A and 2B show the concrete construction of the laser driving circuit 11. FIG. 2A shows an example of the laser driving circuit which is formed of a single integrated circuit chip (IC) 20. In the internal portion of the laser driving circuit, output currents corresponding to input voltages of the data signal DT, D.C. bias signal BS and clock signal CK are generated, the output currents are combined and the resultant current is output to the exterior. The data signal DT is not necessarily a signal which is precisely converted into an NRZ modulation signal form. The data signal DT may be raw data. In this case, the IC 20 is designed to have a function of generating an NRZ modulation signal which is synchronous with the clock signal.

FIG. 2B shows an example of the construction of a circuit for separately subjecting three input signals to respective required amplification processes and then superposing the amplified signals on the semiconductor laser 12. The above circuit is basically most similar to the circuit which has been often used in the prior art. That is, the above circuit includes a data shaping amplifier 21, A.C. amplifier 22, D.C. bias current generator 23, transmission lines 24, 25, matching resistors 26, 27 and coil 28.

The data signal DT is converted into an NRZ modulation voltage amplitude by means of the data shaping amplifier 21. The voltage amplitude is set to a value obtained by multiplying a necessary current amplitude by the impedance of the first transmission line 24. The clock signal CK is converted into a voltage amplitude by the A.C. amplifier 22. The voltage amplitude is set to a value obtained by multiplying a necessary current amplitude by the impedance of the second transmission line 25. The first and second matching resistors are used to attain impedance matching with respect to the respective transmission lines 24 and 25. The bias signal BS is converted into a current by the D.C. bias current generator 23, supplied via the coil 28 and combined with the other two output signals at the connection node 29 of the wiring.

The internal impedance of the semiconductor laser in the high frequency range is as low as 10 Ω or less. Therefore, the impedance of the first transmission line 24 is set to 50 Ω or less. The impedance of the second transmission line 25 is set to be equal to or larger than that of the first transmission line 24. The coil 28 is so designed that the impedance thereof at the cutoff frequency in the low frequency range may be set to be more than 10 Ω. A combination of a D.C. bias voltage generator and a resistor may be used instead of the combination of the D.C. bias current generator 23 and the coil 28.

Further, the laser driving circuit 11 may be constructed as a circuit having an integrated circuit configuration between the circuit configurations shown in FIGS. 2A and 2B. For example, a circuit portion for the data signal DT and clock signal CK may be constructed as a laser driving IC for processing the data signal DT and clock signal CK and generating a resultant current obtained by superposing the two signals on each other. Further, the resultant current from the laser driving IC is combined with an output supplied via the D.C. bias current generator 23 and coil 28. Of course, it is possible to combine a desired two of the three signals of the data signal DT, clock signal CK and bias signal BS according to the application and construct a laser driving IC for generating a resultant current obtained by superposing the desired two signals on each other.

The clock signal CK may be smaller than the data signal DT and the semiconductor laser 12 may basically have a response characteristic of approx. −20 dB or more in the clock frequency. Therefore, the performance which is the same as that of the conventional device is satisfactory. Further, in the laser driving circuit 11, for example, in the construction shown in FIG. 2B, only the A.C. amplifier 22 is required to have a wide-band characteristic. However, the power of the amplifier 22 may be small and therefore this requirement can be easily met.

Figure 3B:
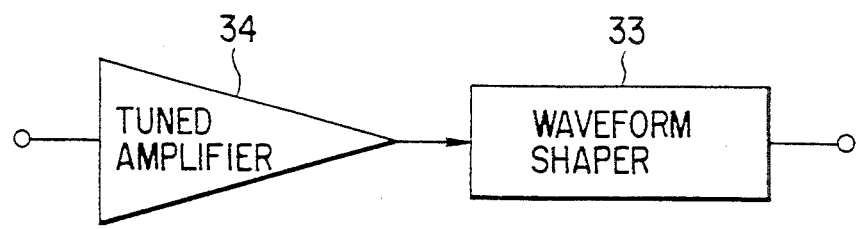
FIG. 3B is a block diagram showing another example of the clock extracting circuit used in the first embodiment.

FIGS. 3A and 3B are block diagrams showing the concrete constructions of the clock extracting circuit 16. Basically, the clock extracting circuit is a circuit for selectively amplifying only the clock frequency component and subjecting the same to the waveform shaping process. In the construction of FIG. 3A, a clock frequency is selectively extracted by use of a band-pass filter 31. Then, an output signal of the band-pass filter is amplified by an amplifier 32 and subjected to the waveform shaping process by a waveform shaping circuit 33 so as to be used as an internal clock signal. The waveform shaping circuit 33 is a circuit for shaping an input signal into a rectangular form. For example, it may be a limiter amplifier. Further, it may include a delay circuit for not only shaping the input signal into the rectangular form but also adjusting the phase of the input signal.

Further, the modified construction which exchanges the band-pass filter 31 with the amplifier 32 in FIG. 3A may be worked as the same operation.

In the construction of FIG. 3B, a tuned amplifier 34 having a function corresponding to a combination of the functions of the band-pass filter 31 and amplifier 32 is used instead of the band-pass filter 31 and amplifier 32. In either case, the non-linear conversion system is not used and the function of amplifying an input signal with limited bandwidth is attained. Therefore, it can be stably operated in response to an input which is small in comparison with the conventional case.

By comparing the clock extracting circuit 16 with the conventional circuit, it is understood that only the substantial difference between them is that the wideband-/highgain amplifier and the full-wave rectifier circuit are eliminated. The photodetector 14 and preamplifier 15 are required to have such bandwidths as to permit the clock frequency component to pass. However, they are not required to have a bandwidth which is as wide as that of the full-wave rectifier circuit. Further, since the mixing of spectra caused by the fullwave rectifier circuit will not occur, Q of the bandpass filter 31 is not required to be set to such a large value as in the conventional case.

Next, the extracting operation of the device with the above construction is explained with reference to signal waveform diagrams shown in FIGS. 4A to 4F.

Figure 4A:
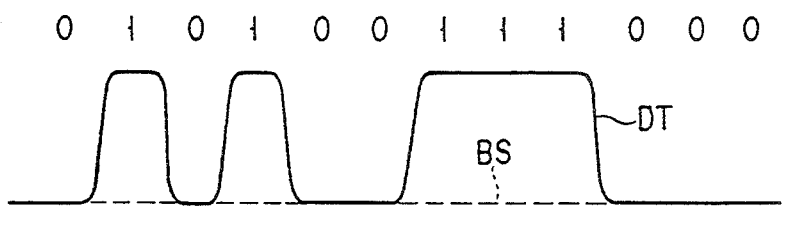
FIG. 4A is a signal waveform diagram showing an example of an optical output in the conventional optical transmission apparatus.
Figure 4B:
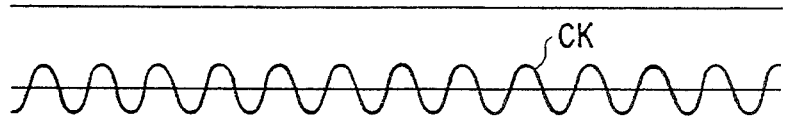
FIG. 4B is a signal waveform diagram showing an example of a clock signal CK.

As described before, an optical output obtained by superposing the NRZ modulation signal, bias signal BS and clock signal CK is generated from the semiconductor laser 12. In this case, FIG. 4A shows a conventional optical output corresponding to a combination of the data signal DT and bias signal BS. In this embodiment, the clock signal CK shown in FIG. 4B is superposed on the combination of the data signal DT and bias signal BS.

Figure 4C:
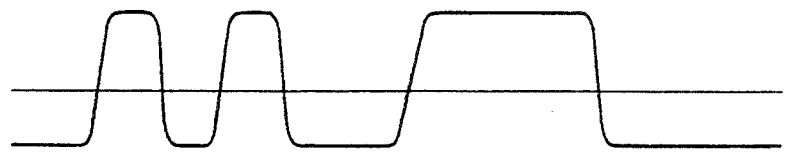
FIG. 4C is a signal waveform diagram showing an example of an output of a wide band A.C. amplifier in the conventional clock extracting circuit.
Figure 4D:
FIG. 4D is a signal waveform diagram showing an example of an output of a full-wave rectifier circuit in the conventional clock extracting circuit.

In the conventional clock extracting circuit described before, a waveform having a D.C. component cut off as shown in FIG. 4C is derived by the wide-band A.C. amplifier and a rectified waveform as shown in FIG. 4D is obtained by the full-wave rectifier circuit. As is understood from the rectified waveform, a portion in which the extracted clock signal cannot be regenerated occurs in a period in which the NRZ modulation signal is continuously kept at the "0" or "1" level.

Figure 4E:
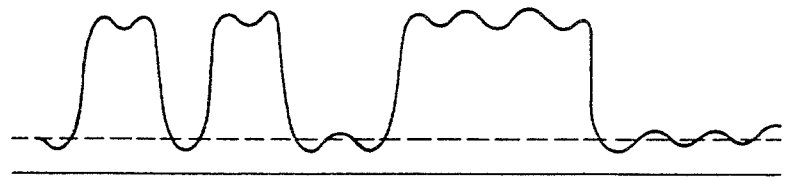
FIG. 4E is a signal waveform diagram showing an example of an optical output in an optical transmission apparatus according to this invention.

In contrast, in a case where the clock signal CK is superposed as in this embodiment, a clock component is directly contained in the optical output signal of the semiconductor laser 12 as shown in FIG. 4E. Therefore, it is easy to extract only the clock signal CK from the above signal. The NRZ modulation signal is completely coherent with respect to the clock. Therefore, even if the clock is superposed, only a preset waveform distortion occurs and no influence occurs on the data regeneration.

Figure 4F:
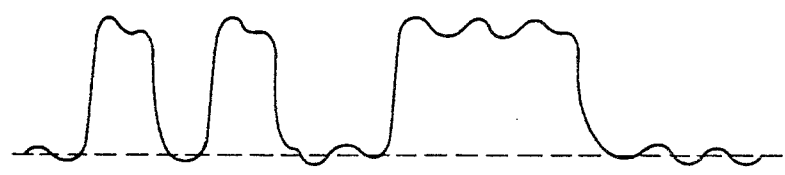
FIG. 4F is a signal waveform diagram showing another example of an optical output in an optical transmission apparatus according to this invention.

The overshoot, undershoot and ringing may occur according to the relative phase relation between the NRZ modulation signal and the clock as shown in FIG. 4F. However, once the phase relation is determined, they occur as a distortion which is always constant. Therefore, if the distortion lies within a discriminating range in which it can be discriminated by use of a discriminator, it does not develop into a serious problem at the time of demodulation of the signal. If necessary, it is possible to provide a sharp notch filter in the input section of a signal processing circuit to eliminate only the clock frequency component and completely eliminate the influences.

Thus, according to this embodiment, the clock can be continuously extracted without receiving any influence by the transmission signal pattern by superposing the bias signal BS and clock signal CK on the NRZ modulation signal DT on the transmitting side and extracting the clock signal CK from the received signal by use of the clock extracting circuit 16 on the receiver side. Further, the apparatus can be made simple in construction and realized at a low cost without using a rectifier and a filter having high Q.

With a means such as an optical bus link for connecting buses of the computers to each other, the data signal pattern is randomly generated and may be sometimes interrupted. This is a serious problem. However, when the construction of this embodiment is applied to data transmission, data can be transmitted without interrupting the clock and lowering the data transmission efficiency by use of a means which is simple in construction. Thus, application of the apparatus of this invention is extremely advantageous.

Figure 5:
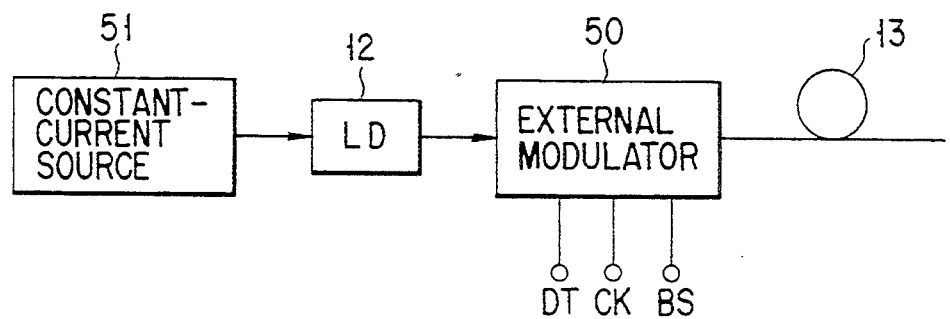
FIG. 5 is a block diagram showing the construction of a main portion of a second embodiment of an optical transmission apparatus according to this invention.

FIG. 5 is a block diagram showing the construction of a main portion of a second embodiment of this invention. In this embodiment, an external modulator 50 formed of electrooptics crystal, for example, LiNbO$_3$ or MQW optical absorption type modulator 50 and a constant current source 51 are used instead of the laser driving circuit 11 used in the first embodiment. A semiconductor laser 12 is driven by the constant current source 51 to emit a constant laser beam and apply the same to the external modulator 50. The external modulator 50 is supplied with an NRZ modulation signal DT, D.C. bias signal BS and clock signal CK as voltage signals to modulate the laser beam by an electric field created by a combination of the above voltage signals.

With the above construction, the same laser beam output as that obtained in the first embodiment can be obtained from the external modulator 50. Therefore, if the receiver section is formed with the same construction as in the first embodiment, the same effect as that in the first embodiment can be obtained.

This invention is not limited to the above embodiments. In the above embodiments, the very high speed optical communication is explained, but this invention is not necessarily limited to this. In the case of low speed optical communication, the response speed of the semiconductor laser is sufficiently high so that a D.C. bias may not be generally necessary. However, even if the D.C. bias is applied, characteristics except the signal-to-noise ratio which may be somewhat deteriorated will not be deteriorated. Therefore, it is possible to apply the D.C. bias. Thus, this invention can be applied in the case of low-speed communication. In addition, this invention can be variously modified without departing from the technical scope thereof.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical transmission apparatus comprising:
   output means for outputting a laser light from a transmission side, said laser light being derived by superposing a D.C. bias and a clock signal on an NRZ modulation signal, said D.C. bias being greater than a threshold current of a semiconductor laser, and said clock signal being a continuous wave which has an amplitude smaller than a difference between the D.C. bias and the threshold current and which is synchronous with the NRZ modulation signal;
   an optical fiber for transmitting the laser beam output from said outputting means to a reception side;
   photodetector means for detecting the laser light transmitted through the optical fiber on the reception side and for converting the detected laser light to an electrical signal;
   clock extracting means for extracting the clock signal, which is the continuous wave, from the electrical signal obtained by the photodetector means; and
   data regenerating means for deriving the NRZ modulation signal from the electrical signal obtained by the photodetector means, in accordance with the clock signal extracted by the clock extracting means.

2. The apparatus according to claim 1, wherein said outputting means includes laser driving means for deriving a current obtained by adding together an NRZ modulation signal, a D.C. bias, and a clock signal having an amplitude smaller than the bias; and
   a semiconductor laser driven by said laser driving means.

3. The apparatus according to claim 2, wherein said laser driving means is constructed by a semiconductor integrated circuit.

4. The apparatus according to claim 3, wherein said laser driving means includes an NRZ modulation circuit which is supplied with data signal and outputs the NRZ modulation signal.

5. The apparatus according to claim 2, wherein said laser driving means includes:

first converting means for converting the clock signal to a current signal of corresponding magnitude;
second converting means for converting the NRZ modulation signal input in synchronism with the clock signal to a current signal of corresponding magnitude;
third converting means for converting the bias signal to a current signal of corresponding magnitude; and
combining/outputting means for combining output signals from said first, second and third means and outputting the combined output signal.

6. The apparatus according to claim 5, wherein said first converting means includes an A.C. amplifier for converting the clock signal to a corresponding voltage amplitude, a transmission line for transmitting an output signal of said A.C. amplifier as a preset signal current, and a matching resistor for transmitting an output of said transmission line to said combining/outputting means;
   said second converting means includes a data shaping amplifier for converting the NRZ modulation signal input in synchronism with the clock signal to a corresponding voltage amplitude, a transmission line for transmitting an output signal of said data shaping amplifier as a preset signal current;
   a matching resistor for transmitting an output of said transmission line to said combining/outputting means; and
   said third converting means includes a D.C. bias current generator for converting the bias signal to a corresponding current amplitude, and a coil or resistor for transmitting an output of said D.C. bias current generator to said combining/outputting means.

7. The apparatus according to claim 5, wherein said laser driving means is constructed by use of individual parts.

8. The apparatus according to claim 5, wherein at least one of said first converting means, second converting means, third converting means and combining/outputting means is constructed by a semiconductor integrated circuit.

9. The apparatus according to claim 1, wherein said outputting means includes:
   a constant current source for supplying a preset constant current;
   a semiconductor laser driven by said constant current source, for outputting a constant laser beam; and
   an external modulator for receiving an NRZ modulation signal, D.C. bias signal and clock signal as voltage signals, modulating the laser beam by an electric field created by a combination of the signals and outputting the modulated laser beam.

10. The apparatus according to claim 1, wherein said data regenerating means further includes a notch filter for eliminating a clock frequency component at the preceding stage of said data regenerating means.

11. The apparatus according to claim 1, wherein said clock extracting means includes a band-pass filter for extracting a clock frequency component from the detected electrical signal, an amplifier for amplifying an output of said band-pass filter and a wave shaper for shaping the waveform of an output of said amplifier.

12. The apparatus according to claim 1, wherein said clock extracting means includes a tuned amplifier for extracting a clock frequency component from the detected electrical signal and amplifying the extracted signal, and a wave shaper for shaping the waveform of an output of said tuned amplifier.

13. An optical transmission apparatus of NRZ modulation system comprising:
   a semiconductor laser for outputting a preset laser beam;
   a current source for driving said semiconductor laser; and
   superposing means for superposing a D.C. bias and a clock signal on a NRZ modulation signal to derive an input current to said semiconductor laser or a laser beam output from said semiconductor laser, said D.C. bias being greater than a threshold current of said semiconductor laser, and said NRZ modulation signal being a continuous wave which has an amplitude smaller than a difference between the D.C bias and the threshold current and which is synchronous with the NRZ modutation signal.

14. The apparatus according to claim 13, wherein said current source and superposing means are combined to construct laser driving means, said laser driving means supplies a current output obtained by adding together the NRZ modulation signal, D.C. bias and clock signal having an amplitude smaller than that of the bias, and said semiconductor laser is driven by means of said laser driving circuit.

15. The apparatus according to claim 14, wherein said laser driving means is constructed by a semiconductor integrated circuit.

16. The apparatus according to claim 15, wherein said laser driving means includes an NRZ modulation circuit which is supplied with data signal and outputs the NRZ modulation signal.

17. The apparatus according to claim 14, wherein said laser driving means includes:
   first converting means for converting the clock signal to a current signal of corresponding magnitude;
   second converting means for converting the NRZ modulation signal input in synchronism with the clock signal to a current signal of corresponding magnitude;
   third converting means for converting the bias signal to a current signal of corresponding magnitude; and
   combining/outputting means for combining output signals from said first, second and third means and outputting the combined output signal.

18. The apparatus according to claim 17, wherein said first converting means includes an A.C. amplifier for converting the clock signal to a corresponding voltage amplitude, a transmission line for transmitting an output signal of said A.C. amplifier as a preset signal current, and a matching resistor of transmitting an output of said transmission line to said combining/outputting eans;
   said second converting means includes a data shaping amplifier for converting the NRZ modulation signal input in synchronism with the clock signal to a corresponding voltage amplitude, a transmission line for transmitting an output signal of said data shaping amplifier as a preset signal current;
   a matching resistor for transmitting an output of said transmission line to said combining/outputting means; and
   said third converting means includes a D.C. bias current generator for converting the bias signal to a corresponding current amplitude, and a coil or resistor for transmitting an output of said D.C. bias current generator to said combining/outputting means.

19. The apparatus according to claim 17, wherein said laser driving means is constructed by use of individual parts.

20. The apparatus according to claim 17, wherein at least one of said first converting means, second converting means, third converting means and combining/outputting means is constructed by a semiconductor integrated circuit.

21. The apparatus according to claim 13, wherein said current source is a constant current source;
   said semiconductor laser is driven by said constant current source and outputting a constant laser beam; and
   said superposing means is an external modulator for receiving an NRZ modulation signal, D.C. bias signal and clock signal as voltage signals, modulating the constant laser beam by an electric field created by a combination of the signals and outputting the modulated laser light.

22. An optical transmission apparatus of NRZ modulation system comprising:
   photodetector means for detecting a laser light derived by superposing a D.C. bias and a clock signal on a NRZ modulation signal and for converting the detected laser light to an electrical signal, said D.C. bias being greater than a threshold current of a semiconductor laser, and said NRZ modulation signal being a continuous wave which has an amplitude smaller than a difference between the D.C. bias and the threshold current and which is synchronous with the; NRZ modulation signal;
   a clock extracting circuit for extracting the clock signal, which is the continuous wave, from the electrical signal obtained by the photodetector means; and
   data regenerating means for deriving the NRZ modulation signal from the electrical signal obtained by the photodetector means, in accordance with the clock signal extracted by the clock extracting circuit.

23. The apparatus according to claim 22, wherein said data regenerating means further includes a notch filter for eliminating a clock frequency component at the preceding stage of said data regenerating means.

24. The apparatus according to claim 22, wherein said clock extracting means includes a band-pass filter for extracting a clock frequency component from the detected electrical signal, an amplifier for amplifying an output of said band-pass filter and a wave shaper for shaping the waveform of an output of said amplifier.

25. The apparatus according to claim 22, wherein said clock extracting means includes a tuned amplifier for extracting a clock frequency component from the detected electrical signal and amplifying the extracted signal, and a wave shaper for shaping the waveform of an output of said tuned amplifier.

* * * * *